July 18, 1933.  W. TODD  1,919,178
BALL AND SOCKET JOINT
Filed May 27, 1932
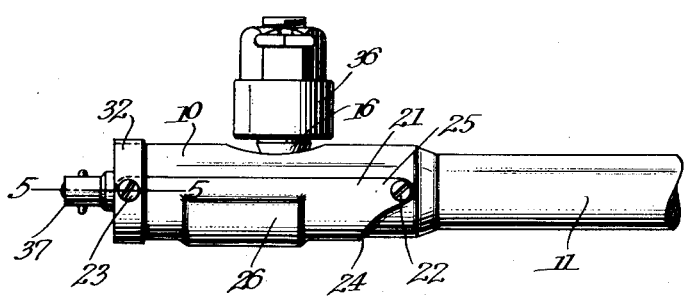
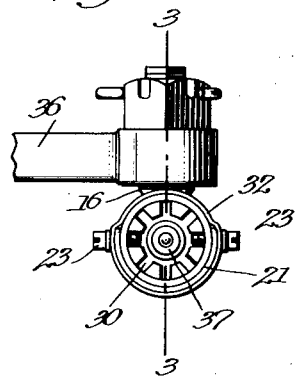
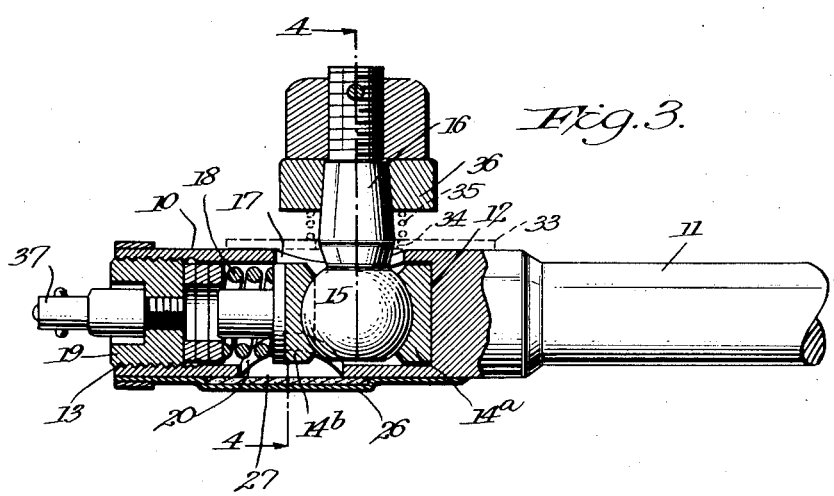
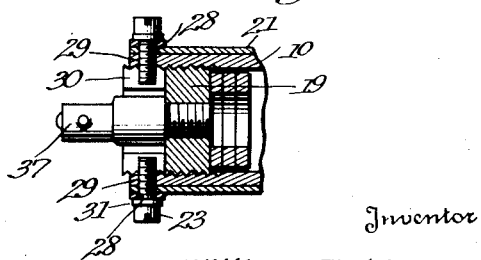
Inventor
William Todd
By William A. Miller
Attorneys Patented July 18, 1933

1,919,178

UNITED STATES PATENT OFFICE

WILLIAM TODD, OF LEOMINSTER, MASSACHUSETTS

BALL AND SOCKET JOINT

Application filed May 27, 1932. Serial No. 614,010.

The present invention relates to rod joint couplings, and more particularly to provisions for preventing the separation or disconnection of a universal joint, such as employed at the ends of tie rods, drag links and the like, used in automobile steering mechanism, or in other places, such separation resulting from excessive wear, crystallization and causing entire loss of control of the vehicle.

The object of the invention is the provision of a ball and socket joint of the above stated character, having novel features of construction, and by which the parts may be readily assembled and disassembled, or parts replaced without entirely disconnecting the joints, yet preventing accidental disconnection while in use.

The invention consists in whatever is described by or included within the terms or scope of the appended claims.

In the drawing which shows the invention as at present devised:—

Figure 1 is a side elevation of the joint construction in accordance with the present invention;

Figure 2 is an end view of the joint;

Figure 3 is a longitudinal section through the rod end and ball joint and taken substantially on line 3—3 of Figure 2;

Figure 4 is a vertical transverse section through the ball joint and substantially on line 4—4 of Figure 3; and Figure 5 is a fragmental longitudinal sectional view through the outer end of the joint illustrating the locking means.

As shown in the drawing, the joint assembly comprises as usual a cylindrical or tubular socket 10, usually forming the extension 11 of a rod or link of metal. The cylinder is closed at one end 12, and opened at its other end 13, the end 12 forming a seat for one of the ball seat members 14a, of which there are usually two, one on each side of a spherical ball 15 having an integral stem or shank 16, usually threaded, to receive an end of a rod, link or other joint. The shank 16 of the ball extends through an opening 17 in the side wall of the cylinder to permit a certain free, lateral or swivelling movement thereof, and this assembly is held tightly together by a compression spring 18, interposed between the other seat member 14b and a plug or cap 19, closing the open end of the cylinder, and is usually externally threaded to engage internal threads on the outer end of the sleeve. This is more or less conventional construction in a ball and socket joint, and no invention or novelty is claimed for the construction thus far specifically described. The present invention resides in the following described construction, or the equivalent thereof:

The opening 17 is preferably elongated and extended longitudinally of the sleeve, but of smaller dimensions than that of the ball 15, so that the ball cannot be drawn or passed through the slot 17 at any point thereof. Opposite the opening 17, but preferably offset with respect to the central axis thereof, is an opening 20 formed in the sleeve 10, and of such dimensions as will permit the shank 16 and the ball 15 to be passed therethrough angularly with respect to the axis thereof, so that the shank may be also passed through the opening 17 and the ball shank moved within the interior of the sleeve 10, to the position shown in Figure 3 of the drawing. In this assembled position, the stem 16 extends through the opening 17 and the ball will be moved laterally by the spring 18 from opposite the opening 20 to a point opposite a side wall of the sleeve. Thus, in operation, any thrust or strain which may cause the ball to move transversely in the sleeve, will be obstructed by the edges of the opening 6 on one side, and on the other side by the side wall of the sleeve. Another advantage for this construction is that should it become desirable to remove the ball and its shank for the cylinder, this may be done by merely loosening the plug 19 without entirely removing it from position, or otherwise disassembling the entire joint.

In order to close the opening 20 for the purpose of preventing disconnection of the joints or movement of any of the parts therethrough, should any of the parts become loose or broken, and further, for the purpose of excluding dust and dirt in the opening, a curved plate 21 is provided and hinged, as at 22, at one end to the cylindrical socket and detachably secured at the other end, as at 23, so that it may be readily opened and closed. This plate 21 is shaped to conform to the contour of the socket, and is preferably elongated and bent transversely in semicircular shape. One end of the plate is cut away, as at 24, from its corners, for a distance inwardly so as to provide two oppositely extending ears 25, having openings therein through which extend screws or other suitable pins 22 carried on the socket, thus permitting the plate to swing on said pins to open and close the opening 20. An intermediate portion of the plate, that is, that portion lying opposite the opening 20, is outwardly depressed, as at 26, to form a pocket or recess in which is deposited a pad of leather or other suitable material 27, which will form a tight contact about the edges of the opening 20 when the plate is compressed in closed position against the side of the socket, thus retaining the grease or other lubricant within the socket, and also excluding dust and dirt from the socket. The outer end of the plate is formed with openings 28, which are lined with threaded openings 29 in the outer end of the socket, and through which lock bolts extend. These latter openings are positioned so as to register with an annular series of notches or kerfs 30 or other depressions or projections usually provided upon the plug cap for the purpose of locking it in position after it has been screwed into place. Thus the bolts 23 serve a two-fold purpose of holding plate in position and locking the plug cap in its position. Of course, it will be understood that lock washers 31 may be interposed between the head of the bolts 23 and the plate 21.

In some instances, it may be found desirable to provide a ring 32 which may be slipped on the outer end of the socket so as to embrace the outer end of the socket and the outer end of the plate 21, this ring also having suitable openings through which the bolts 23 may extend. In order to prevent the lubricant from unduly leaking through the slot 17 and also to exclude dust and water from the interior of the socket joint, a shield 33 is provided to cover the slot 17. This shield consists of a plate shaped to conform externally to the surfaces of the socket adjacent the opening 17, and has an opening 34 therein of a size and shape through which the shank 16 may extend. The opening is sufficiently large to permit the shank to teeter therein, and the shield is pressed against the outer surfaces of the socket by a compression spring 35, surrounding the stud and having its outer end bearing against the part 36 which may be a connecting rod or other suitable element.

From the above will be seen that a very simple and desirable construction has been provided, by which the parts of a ball and socket joint may not become disconnected by reason of the spring 18 becoming crystallized or broken, or the plug 18 working loose or falling out; that under all circumstances, the ball 15 will be held within the socket, so that some control of the steering mechanism (if the device is used in such manner) may be maintained; also that the ball joint may be quickly removed from the socket by the removal of the bolts 23 and permitting the plate 21 to swing upon its hinged end 22, which swinging movement is permitted by the cut out portion 24 of the plate. It will also be observed that the locking bolts 23 serve a two-fold purpose, and eliminate the necessity of using cotter pins, which are difficult to spread around the lubricator nipple, usually carried by the plug 19.

In this specification and the annexed drawing, the invention is disclosed in the form in which it is considered to be the best, but the invention is not limited to such form because it is capable of being embodied in this form; and it is to be understood that in and by the claims following the description herein, it is intended to cover the invention in whatever form it may embody within the scope thereof.

Having thus described the invention, what is claimed as new and described to secure by Letters Patent, is:—

1. A safety ball and socket joint including a tubular socket member having substantially oppositely disposed side openings therein, a headed member in said socket and having a shank fixed thereto and extending through one of said openings, which is of such dimensions as to prevent the head from passing therethrough but permitting movement of the shank therein, the other of said openings permitting said head and shank to pass therethrough, and a closure plate curved to conform to the outer side wall of the socket and hingedly mounted at one end to said socket for opening and closing said last mentioned opening, and means detachably locking the distal end of said closure to the socket.

2. A safety ball and socket joint including a tubular socket member opened at one end and closed by a plug and having substantially oppositely disposed side openings in the side walls thereof, a headed member in the socket and having a shank fixed thereto and extending through one of said openings, which is of such dimensions as to prevent the head from passing therethrough but permitting movement of the shank therein, the other of said side openings permitting said head and shank to pass therethrough, and a closure plate curved conforming to the contour of said socket adjacent said last mentioned opening for closing the same and pivoted at one end to said socket, and means detachably locking the distal end of said closure to the socket and also engaging said plug to lock it in position.

3. A safety ball and socket joint including a socket member having substantially oppositely disposed openings therein, a headed member in the socket and having a shank fixed thereto and extending through one of said openings, which is of such dimensions as to prevent the head from passing therethrough but permitting lateral movement of the shank therein, the other of said openings permitting said head and shank to pass therethrough, and a closure plate conforming to the contour of said socket adjacent said last mentioned opening for closing the same and pivoted at one end to said socket, and means detachably locking the distal end of said closure to the socket, a pad carried by the plate at a point opposite said last opening to be pressed against the edges thereof when the plate is in position.

4. A safety ball and socket joint including a tubular socket member opened at one end and closed by a plug having notches therein and further having substantially oppositely disposed apertures in the side-walls thereof, a ball head member in the socket and having a shank fixed to said ball and extending through one of said openings, which is of such dimensions as to prevent the head from passing therethrough but permitting movement of the shank therein, while the other of said openings permits said head and shank to pass therethrough, and an elongated closure plate conforming to the contour of said socket adjacent said last mentioned opening for closing the same and pivoted at one end to said socket, and locking pins at the distal end of said closure, said pins extending through said plate and socket and into the notches of said plug, whereby the parts are detachably secured together.

5. In a safety ball and socket joint, including a tubular socket member having a side opening therein through which the ball may be inserted in and removed from said socket, a closure plate for the opening curved to conform to and lie against the outer surface of said socket, said closure being hingedly mounted on said socket for opening and closing said opening therein, and means detachably locking said closure to the socket.

6. A safety device for ball and socket joints which include a tubular socket member having an opening therein through which a ball member may be inserted in and removed from said socket, said device comprising a closure plate for said opening curved to conform to the contour of the socket adjacent said opening and lie thereagainst, opposite curved corner portions of said plate having outwardly projecting ears, means on said ears for pivotally securing said closure on said socket, and means at the distal end thereof for detachably locking said plate to said socket.

WILLIAM TODD.